United States Patent [19]

Volz

[11] 4,386,456
[45] Jun. 7, 1983

[54] METHOD OF ASSEMBLING A UNITARY HEAT EXCHANGER TUBE BUNDLE ASSEMBLY

[75] Inventor: Herbert A. Volz, Bartlesville, Okla.

[73] Assignee: Phillips Petroleum Company, Bartlesville, Okla.

[21] Appl. No.: 194,721

[22] Filed: Oct. 7, 1980

Related U.S. Application Data

[62] Division of Ser. No. 891,981, Mar. 31, 1978.

[51] Int. Cl.³ .............................................. B23P 15/26
[52] U.S. Cl. ............................. 29/157.3 R; 29/455 R; 29/446; 248/49; 248/74 A; 376/436; 165/162
[58] Field of Search ............... 29/157.3 R, 446, 157.4, 29/455 R; 248/49, 74 A; 376/436, 434; 165/158-162, 82; 122/510; 138/112, 113; 206/443

[56] References Cited

U.S. PATENT DOCUMENTS

| | | | |
|---|---|---|---|
| 1,798,167 | 3/1931 | Parker | 248/49 |
| 1,959,633 | 5/1934 | Madden | 248/49 |
| 2,402,209 | 6/1946 | Ryder | 165/162 |
| 2,505,695 | 4/1950 | Villiger et al. | 165/162 |
| 2,512,116 | 6/1950 | Siebels | 29/455 R |
| 2,749,600 | 6/1956 | Persson | 29/157.3 AH |
| 2,756,032 | 7/1956 | Dowell | 29/455 R |
| 3,083,763 | 4/1963 | Brown, Jr. | 165/159 |
| 3,137,638 | 6/1964 | Kumpf et al. | 122/510 |
| 3,237,796 | 3/1966 | Callahan | 206/443 |
| 3,643,005 | 2/1972 | Mathews | 138/113 |
| 3,708,142 | 1/1973 | Small | 165/162 |
| 3,779,583 | 12/1973 | Nuber | 29/455 R |
| 3,858,646 | 1/1975 | Naylor | 165/162 |

FOREIGN PATENT DOCUMENTS

| | | | |
|---|---|---|---|
| 82884 | 6/1957 | Denmark | 29/157.3 R |
| 1026192 | 4/1953 | France | 165/162 |
| 488944 | 7/1938 | United Kingdom | 165/162 |
| 737911 | 10/1955 | United Kingdom | 29/157.3 R |

*Primary Examiner*—Daniel C. Crane

[57] ABSTRACT

An improved heat exchanger in which the tube bundle therein comprises a plurality of tubes supported intermediate their ends by at least one annular enlargement disposed around and frictionally secured to the outer surface of at least one of the tubes with the annular enlargement contacting the outer surface of each tube next adjacent thereto. Means are also provided for encircling and maintaining the tubes in spaced relation in contact with the annular enlargements. Method of constructing the tube bundle for the heat exchanger is also disclosed.

5 Claims, 23 Drawing Figures

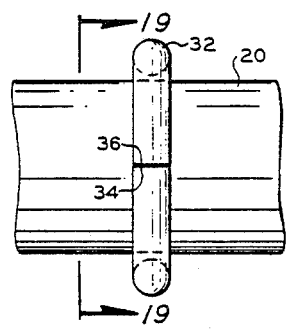 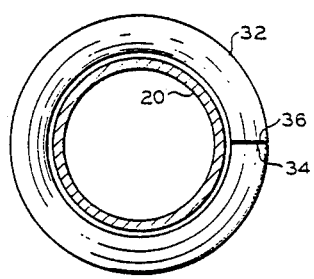
FIG. 18　　　　　FIG. 19
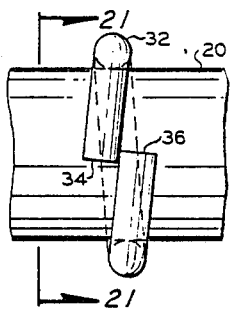 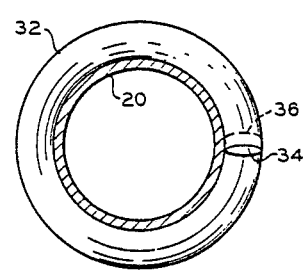
FIG. 20　　　　　FIG. 21
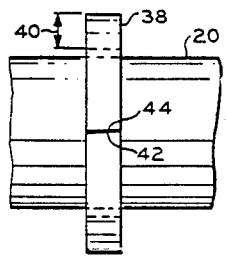 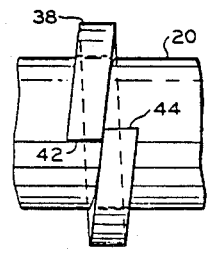
FIG. 22　　　　　FIG. 23

METHOD OF ASSEMBLING A UNITARY HEAT EXCHANGER TUBE BUNDLE ASSEMBLY

This application is a divisional of copending application Ser. No. 891,981, filed Mar. 31, 1978.

The present invention relates generally to heat exchangers. In one aspect the invention relates to heat exchanger structure. In another aspect the invention relates to heat exchanger construction technique.

Heat transfer is an important part of any process. As is well known, an indirect transfer of heat from one medium to another is usually accomplished by the use of heat exchangers of which there are many types. For example, there are double pipe, shell and tube, plate heat exchangers and others, indeed, the art of heat exchanger design is developed to a high degree. However, there is still room for improvement in a number of areas, such as reducing pressure drop, increasing overall heat transfer coefficients, reducing fouling, and in heat exchangers utilizing a tube bundle, such as the shell and tube heat exchangers, improving the tube support and ease and economy of assembly. In many instances, the tubes in a shell and tube heat exchanger prematurely fail because the tubes vibrate or rub against one another or other parts of the heat exchanger, such as for example, a baffle or the shell.

The art has heretofore recognized the need for tube support. Plate-type baffles have been used in heat exchangers for many years. Such baffles provide support for the tubes to at least some degree. The double segmental plate-baffle heat exchanger is well known to those skilled in the art, and although heat exchangers using plate-type baffles were a relatively early development in heat exchanger design, such exchangers are still widely used today. In most plate-type baffle heat exchangers the passages in the plate baffles through which the tubes pass are slightly larger in diameter than the outside diameter of the tubes in order to facilitate construction of the exchanger, and, as a result, vibration of the tubes can and does often occur, which frequently results in premature tube failure.

For the more recent rod baffled heat exchangers, it is desirable to be able to assemble the heat exchanger bundles without having zero clearance between tube-supporting baffle rods or bars and the tubes while the tubes are being installed into the tube sheet. Due to manufacturing variances, the rods and tubes of conventional tube bundles are sometimes slightly larger or smaller than specified. Due to such dimensional variations, after several rows of tubes have been installed through the baffle rods, the tubes often fail to match the corresponding appertures in the tube sheet and are so tight in the rod baffle structures that damage can be done to the tubes during the assembly procedure.

If, however, the outer diameters of either or both the tubes and the rods are designed with slightly smaller dimensions to facilitate the complete assembly of the tube bundle, the tubes will not be tight in the baffles and will be subject to vibration-induced wear during operation which can result in tube damage and premature failure of the heat exchanger.

In accordance with the present invention I have discovered that an improved heat exchanger structure is provided by utilizing at least one annular enlargement disposed around and frictionally secured to the outer surface of at least one of the tubes intermediate the opposite ends of the bundle of tubes. The annular enlargement peripherally contacts the outer surface of each of the tubes next adjacent the tube carrying the annular enlargement. Retaining means are provided which extend around the bundle of tubes proximate the annular enlargement for engaging and maintaining the tubes in spaced mutual and parallel relation with the annular enlargement contacting the respective next adjacent tubes whereby relative tube position is maintained and tube vibration is suppressed.

More specifically, a heat exchanger is provided of the type which includes a substantially closed vessel having opposite end portions, a first fluid inlet and first fluid outlet, and a second fluid inlet and second fluid outlet. An improved tube bundle assembly is disposed within the vessel and comprises a longitudinally oriented bundle of tubes having opposite ends, the tubes being positioned in transversely spaced mutually parallel relation. The tube bundle assembly further comprises means for supporting the tubes in spaced mutually parallel relation and suppressing vibration, said means including an annular enlargement disposed around and firctionally secured to the outer surface of at least one of the tubes intermediate the opposite ends of the bundle of tubes with the annular enlargement peripherally contacting the outer surface of each of the tubes next adjacent the tube carrying the annular enlargement. Retaining means are also provided extending around the bundle of tubes proximate the annular enlargement for engaging and maintaining the tubes in spaced mutually parallel relation with the annular enlargement contacting the respective next adjacent tubes. A tube sheet is disposed within the vessel for connection with the tubes and tube securing means is provided for securing the ends of the tubes to the tube sheet.

In another aspect, the present invention provides a method of assembly of a unitary heat exchanger tube bundle assembly comprising a plurality of tubes which involves the arranging of the tubes in a plurality of rows and a plurality of columns with each tube of each row spaced a distance from an adjacent row and each tube of each column spaced a distance from an adjacent column with the tubes of each row being positioned in a common plane and the tubes of each column being positioned in a common plane that intersects the planes of the rows of tubes at a predetermined angle. Resilient annular spring clips or rings are positioned around selected individual tubes whereby each of the spring clips contacts the outer surface of each next adjacent tube. The tubes and resilient annular spring clips are urged into firm contact one with another and the tubes are then encircled with a rigid structure contacting the outermost tubes to maintain the tubes and annular spring clips in firm contact one with another to form a unitary tube bundle assembly.

An object of the present invention is to provide an improved heat exchanger.

Another object of the present invention is to provide improved support for tubes of a heat exchanger tube bundle assembly.

A further object of the present invention is to provide an improved method of assembly of a tube bundle of a heat exchanger.

A still further object of the present invention is to provide a heat exchanger having improved reliability.

Yet another object of the present invention is to facilitate the construction of heat exchangers.

Still another object of the present invention is to provide an improved heat exchanger which is economical in construction and operation.

Other objects, aspects and advantages of the present invention will be apparent to those skilled in the art upon reference to the present specification and accompanying drawings in which:

FIG. 18 is a partial side elevation view of a tube with an annular resilient spring clip loosely disposed therearound;

FIG. 19 is a cross-sectional view taken along line 19—19 of FIG. 18;

FIG. 20 is a partial side elevation view similar to FIG. 18 showing the annular resilient spring clip frictionally engaging the outer surface of the tube;

FIG. 21 is a cross-sectional view taken along line 21—21 of FIG. 20;

FIG. 22 is a partial side elevation view of a tube with an alternate form of annular resilient spring clip loosely disposed thereabout; and FIG. 23 is a partial side elevation view similar to FIG. 22 showing tha annular resilient spring clip frictionally engaging the outer surface of the tube.

Figure 1:
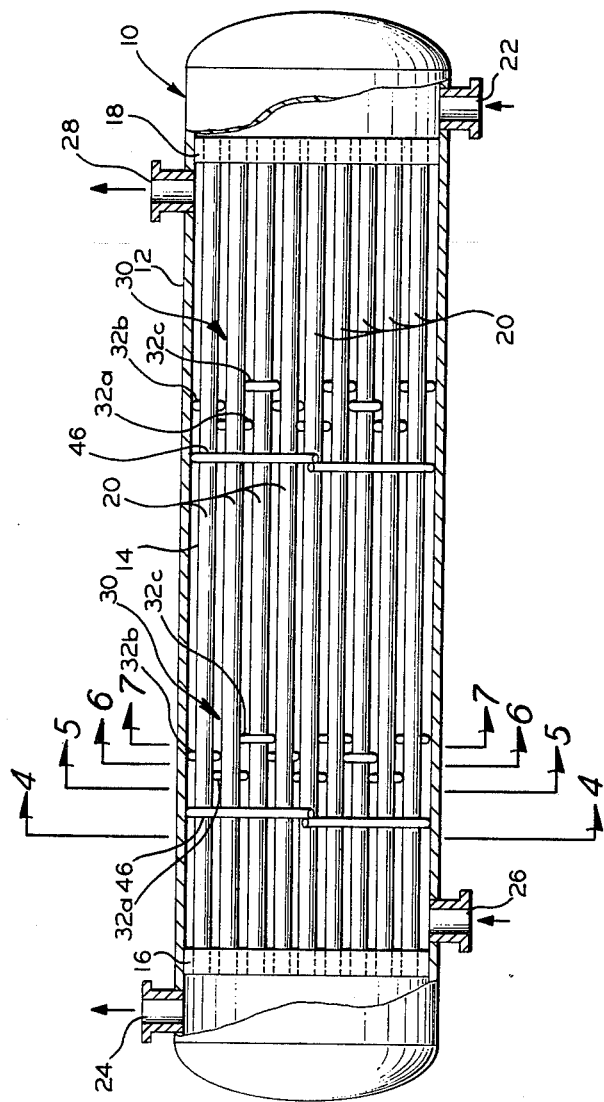
FIG. 1 is a side elevation view of a single pass heat exchanger constructed in accordance with the present invention with portions of the shell broken away to more clearly illustrate the tube bundle construction.

Referring now to the drawings, and to FIG. 1 in particular, a single pass shell and tube heat exchanger, generally designated by the reference character 10, is illustrated therein. The heat exchanger 10 comprises a shell 12 and a tube bundle 14 positioned therein.

The tube bundle 14 includes a pair of tube sheets 16 and 18 having apertures formed therein through which the opposite ends of a plurality of tubes 20 extend. The opposite ends of the tubes are secured in the apertures of the respective tube sheets by suitable means, such as by welding or expanding the tubes into the tube sheets, to provide leak-proof spacing of the plurality of parallel aligned tubes 20. Nozzles 22 and 24 communicate with the respective opposite ends of the tube side of the heat exchanger 10, thus providing means for passing a first fluid through the tubes. Nozzles 26 and 28 communicate with the respective ends of the shell side of the heat exchanger 10 and provide means for passing a second fluid over the outside surfaces of the tubes, preferably using countercurrent flow of the heat exchange fluids or mediums. Nozzles 22 and 26 are preferably fluid inlet nozzles while nozzles 24 and 28 are preferably fluid outlet nozzles.

As shown in FIGS. 4, 5, 6, and 7, the tubes 20 in the heat exchanger 10 are laid out in equilateral triangular pitch wherein each tube is equally spaced from the tubes next adjacent thereto. It will be seen that the tubes 20 are arranged in a plurality of rows each lying in a horizontal plane and in a plurality of columns each lying in a plane intersecting the planes of the tube rows at an angle of 60 degrees.

Intermediate the opposite ends of the tube bundle 14, means are provided at predetermined intervals for supporting the tubes in spaced mutually parallel relation and suppressing vibration. Each supporting means is generally designated by the reference character 30. The supporting means 30 comprises a plurality of annular enlargements in the form of resilient annular spring clips or rings 32 disposed around and frictionally secured to the outer surfaces of selected tubes 20. When unassembled and relaxed, each spring clip 32 has an inside diameter slightly less than the outside diameter of the tube 20 to which it is to be frictionally secured. To position the spring clips 32 on the corresponding tubes 20, the clips are expanded by stressing or deforming them against their internal spring bias to positions wherein the inside diameter of each spring clip is greater than the outside diameter of the corresponding tube 20, as is illustrated in FIGS. 18 and 19. The spring clip 32 can be conveniently maintained in this stressed condition by abutting the opposite end faces 34 and 36 of circular cross-section, as shown in FIGS. 18 and 19, until the spring clip is suitably longitudinally positioned on the tube 20 at which time appropriate twisting force can be applied to the spring clip to disengage the end faces 34 and 36 and permit the spring clip to achieve a partially relaxed position wherein the outer surface of the tube is frictionally engaged thereby as is illustrated in FIGS. 20 and 21. The spring clips 32 are formed of a suitable resilient material such as metal rod or bar stock having a circular cross-section of a diameter equal to the minimum desired clearance between adjacent tubes.

FIGS. 22 and 23 illustrate an alternate form of resilient annular spring clip designated by reference character 38. The spring clip 38 is noncircular in cross-section and is preferably either square or rectangular in cross-section although other cross-sectional shapes may be employed. The radially measured thickness of the spring clip 38 is designated by the reference character 40 and is equal to the minimum desired clearance between adjacent tubes 20. The opposite end faces 42 and 44 of the spring clip 32 can be suitably beveled with respect to the longitudinal axis of the tube 20 to facilitate disengagement of the end faces as shown.

The supporting means 30 further includes retaining means in the form of a ring or polygonal structure or the like 46 which extends around the bundle of tubes 20 proximate to the spring clips 32. The structure 46 can be a circular plate with a hexagonal opening therein sized such that its periphery will correspond to the inner surface of the shell 12 thus preventing shell fluid from bypassing the tube bundle. The ring structure 46 engages the periphery of the tube bundle 14 and maintains the tubes 20 in spaced, mutually parallel relation with the resilient annular spring clips 32 contacting the respective next adjacent tubes 20 whereby relative tube position is maintained and tube vibration is suppressed at least in the area of the supporting means 30.

Figure 4:
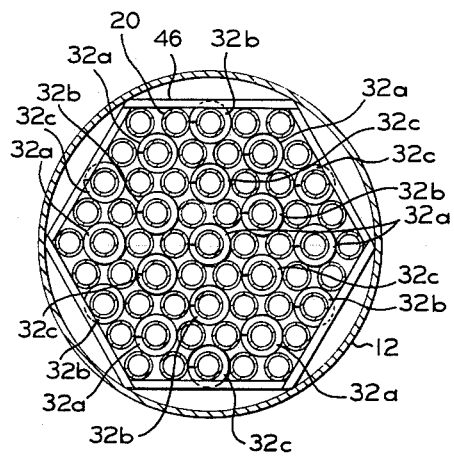
FIG. 4 is a cross-sectional view taken along line 4—4 of FIG. 1.
Figure 5:
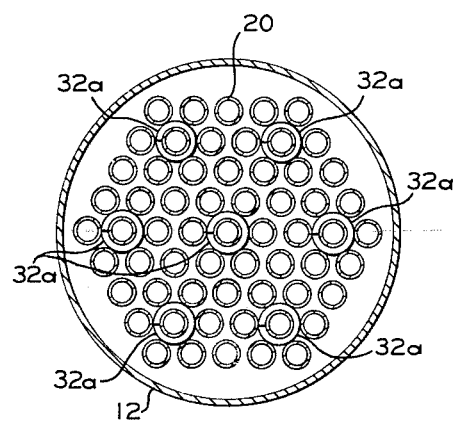
FIG. 5 is a cross-sectional view taken along line 5—5 of FIG. 1.
Figure 6:
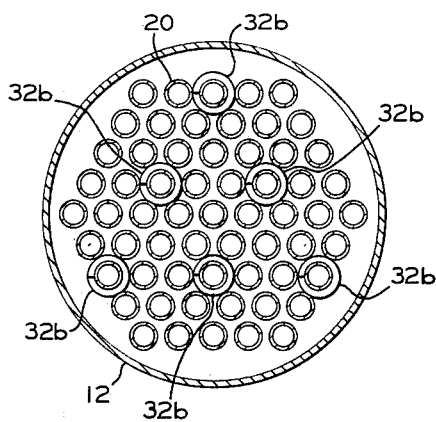
FIG. 6 is a cross-sectional view taken along line 6—6 of FIG. 1.
Figure 7:
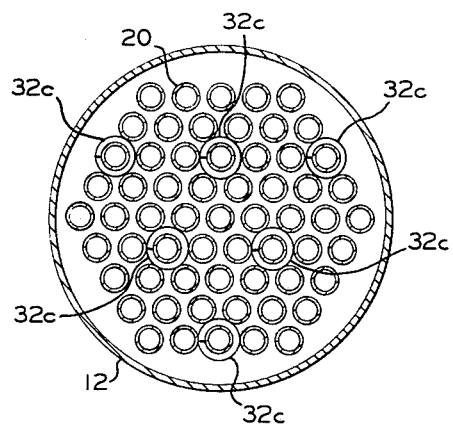
FIG. 7 is a cross-sectional view taken along line 7—7 of FIG. 1.
Figure 8:
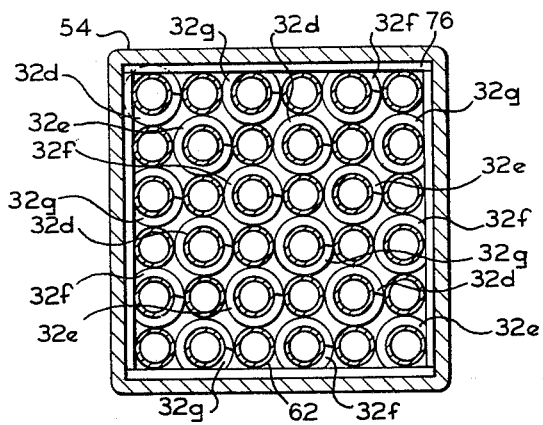
FIG. 8 is a cross-sectional view taken along line 8—8 of FIG. 2.

The resilient annular spring clips 32 are so longitudinally positioned on the tubes 20 that transversely adjacent spring clips are longitudinally spaced apart along the tube bundle to minimize pressure drop of the heat transfer medium passing thereby. In the tube bundle 14, the spring clips 32 are arranged in three mutually parallel transverse planes which are aligned normal to the longitudinal axes of the tubes 20 and which are spaced longitudinally along the tubes. FIG. 4 illustrates the structure 46 which surrounds and retains the tube bundle 14. FIG. 5 illustrates the spring clips in the transverse plane nearest the ring structure 46, these spring clips being designated as 32a. FIG. 6 illustrates the spring clips lying in the second transverse plane and designated by the reference character 32b, which second transverse plane is longitudinally spaced from the first transverse plane of the spring clips 32a. FIG. 7 illustrates the third transverse plane spaced longitudinally from the previously mentioned second transverse plane and in which each of the third group of spring clips lies, each of the third group of spring clips being designated by the reference character 32c. It will be understood that the ring structure 46 can be of any suitable rigid structure and can be positioned other than as illustrated as long as it is positioned proximate the spring clips of the corresponding support means 30.

It will be seen that the arrangement of spring clips 32 in the supporting means 30 places no more than 7 spring clips in any one plane of the tube bundle 14 comprising 61 tubes. This arrangement provides for a relatively small pressure drop across the supporting means 30 while rigidly supporting the tubes in the desired mutually parallel relation and suppressing transverse vibration.

Figure 2:
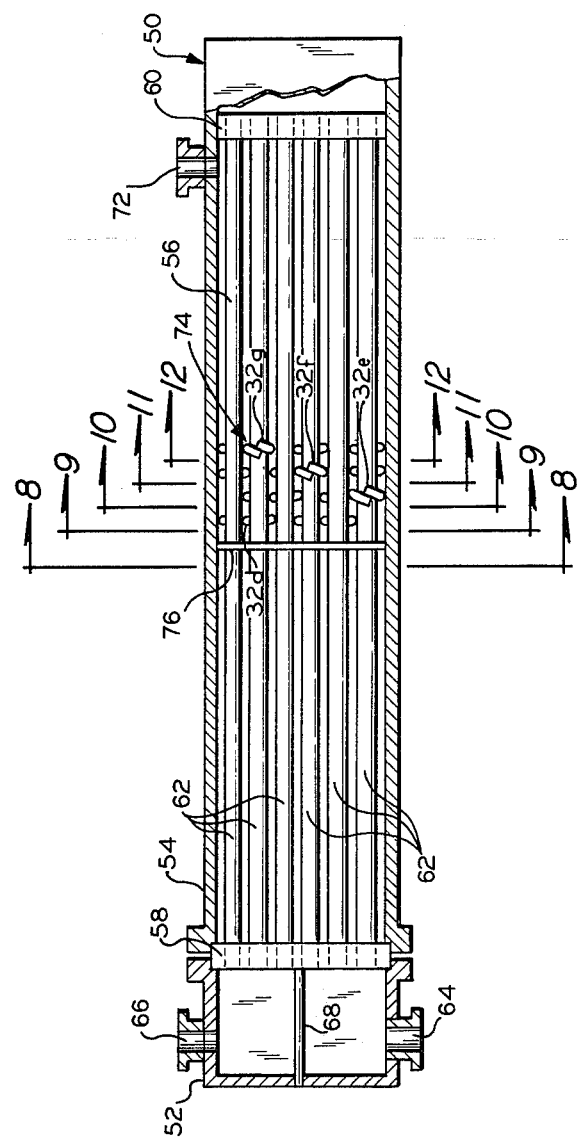
FIG. 2 is a side elevation view of a double pass heat exchanger constructed in accordance with the present invention with portions of the shell broken away to more clearly illustrate the tube bundle construction.

Referring now to FIG. 2, a tube-side double-pass heat exchanger is illustrated therein and is generally designated by the reference character 50. The heat exchanger 50 comprises a baffled inlet-outlet head 52, a shell 54 conforming thereto and a tube bundle 56 positioned within the shell 54.

The tube bundle 56 includes a pair of tube sheets 58 and 60 having apertures formed therein through which the opposite ends of a plurality of tubes 62 extend. The opposite ends of the tubes are secured in the apertures of the respective tube sheets by suitable means such as by welding or expanding the tubes into the tube sheets to provide leak-proof spacing of the plurality of parallel aligned tubes 62. Nozzles 64 and 66 communicate with the lower and upper sides of the baffled head 52, respectively, and are separated one from the other within the head by means of partition 68, thus providing means for passing a first fluid through one half the tubes of the tube bundle 56 in a first direction and returning the fluid through the other half of the tubes in the tube bundle 56 in a second direction which results in two passes through the tubes of the tube bundle intermediate the tube sheets 58 and 60. Nozzles 70 and 72 communicate with the respective ends of the shell side of the heat exchanger 50 and provide means for passing a second fluid over the outside surfaces of the tubes 62. Nozzles 64 and 70 are preferably fluid inlet nozzles while nozzles 66 and 72 are preferably fluid outlet nozzles.

As shown in FIGS. 8, 9, 10, 11 and 12, the tubes 62 in heat exchanger 50 are laid out in a square pitch wherein the tubes 62 are arranged in a plurality of rows each lying in a horizontal plane and in a plurality of columns each lying in a plane intersecting the planes of the tube rows at an angle of 90 degrees. The tubes in each tube row are equally spaced from the tubes next adjacent thereto as are the tubes in each tube column.

Intermediate the opposite ends of the tube bundle 56, means are provided at predetermined intervals for supporting the tubes in spaced mutually parallel relation and suppressing vibration. Each supporting means is generally designated by the reference character 74. In the instant case only one supporting means 74 is illustrated, it being understood that any number of such supporting means may be installed in the tube bundle 56 as desired. The supporting means 74 comprises a plurality of annular enlargements in the form of the previously described resilient annular spring clips 32 disposed around and frictionally secured to the outer surfaces of selected tubes 62. Positioning and securing of the spring clips 32 to the tubes 62 is identical to that described above for the heat exchanger 10 and need not be described in detail again. It will also be understood that the alternate form of resilient annular spring clip designated by the reference character 38, and shown in FIGS. 22 and 23, can also be employed in the construction of the heat exchanger 50.

The supporting means 74 further includes retaining means in the form of a ring structure or the like 76 which extends around the bundle of tubes 56 proximate to the spring clips 32. The ring structure 76 engages and maintains the tubes 62 in spaced mutually parallel relation with the resilient annular spring clips 32 contacting the respective next adjacent tubes 62 whereby relative tube position is maintained and tube vibration is suppressed in the area of the supporting means 74. The 6 tubes by 6 tubes square configuration of heat exchanger bundle 56 of FIGS. 2, 8, 9, 10, 11 and 12 is shown to clearly portray the application of this novel support method and apparatus. Such a tube bundle would of necessity be housed in a shell 54 of square cross-section, compatibly dimensioned.

Square pitch tube bundles are of course widely constructed for shells of circular cross-section in which the tube rows and columns comprise differing numbers of tubes and to which the instant method of tube spacing and support is equally applicable.

Figure 9:
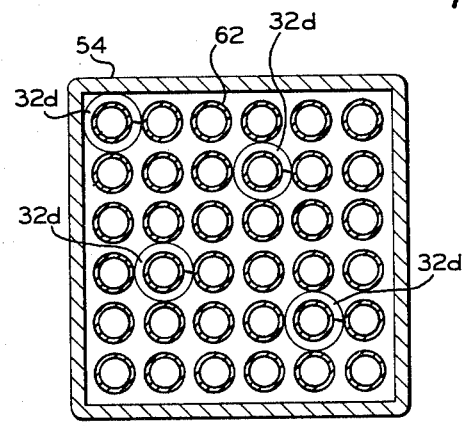
FIG. 9 is a cross-sectional view taken along line 9—9 of FIG. 2.
Figure 10:
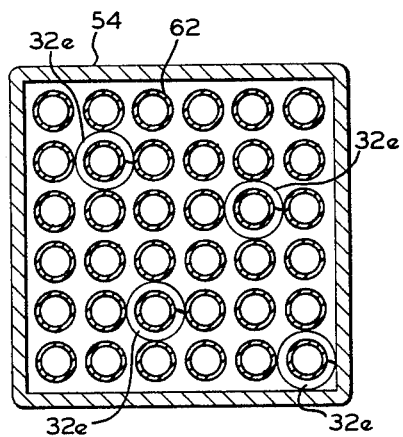
FIG. 10 is a cross-sectional view taken along line 10—10 of FIG. 2.
Figure 11:
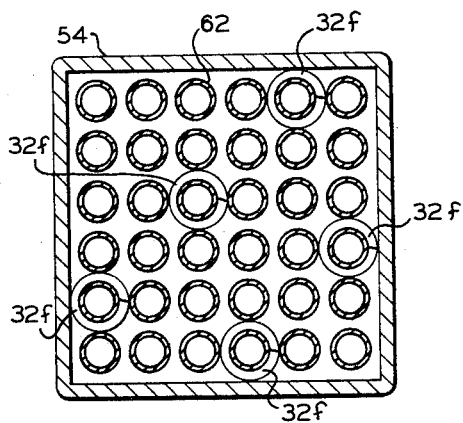
FIG. 11 is a cross-sectional view taken along line 11—11 of FIG. 2.
Figure 12:
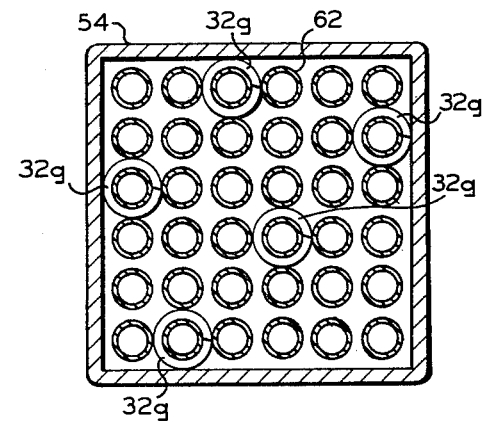
FIG. 12 is a cross-sectional view taken along line 12—12 of FIG. 2.
Figure 13:
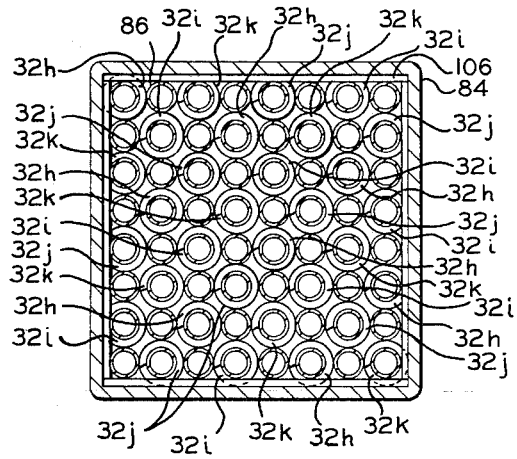
FIG. 13 is a cross-sectional view taken along line 13—13 of FIG. 3.

The resilient annular spring clips 32 of the supporting means 74 are so longitudinally positioned on the tubes 62 that transversely adjacent spring clips are longitudinally spaced apart along the tube bundle to minimize pressure drop of the heat transfer medium passing thereby. In the tube bundle 56, the spring clips 32 are arranged in four transverse planes which are aligned normal to the longitudinal axes of the tubes 62 and which are spaced longitudinally along the tubes. FIG. 9 illustrates the spring clips in the transverse plane nearest the ring structure 76, the spring clips in this plane being designated as 32d. FIG. 10 illustrates the spring clips lying in the second transverse plane, each designated by the reference character 32e, which second transverse plane is longitudinally spaced from the first transverse plane of the spring clips 32d. FIG. 11 illustrates the third transverse plane spaced longitudinally from the previously mentioned second transverse plane and in which each of the third group of spring clips lies, each of the third group of spring clips being designated by the reference character 32f. FIG. 12 illustrates the spring clips lying in the fourth transverse plane spaced longitudinally from the previously mentioned third transverse plane and in which each of the fourth group of spring clips lies, each of the fourth group of spring clips being designated by the reference character 32g.

It will be seen that the arrangement of spring clips 32 in the supporting means 74 places no more than 5 spring clips in any one plane of the 36-tube tube bundle 56. This arrangement provides for a relatively small pressure drop across the supporting means 74 while rigidly supporting the tubes in the desired mutually parallel relation and suppressing vibration.

Figure 3:
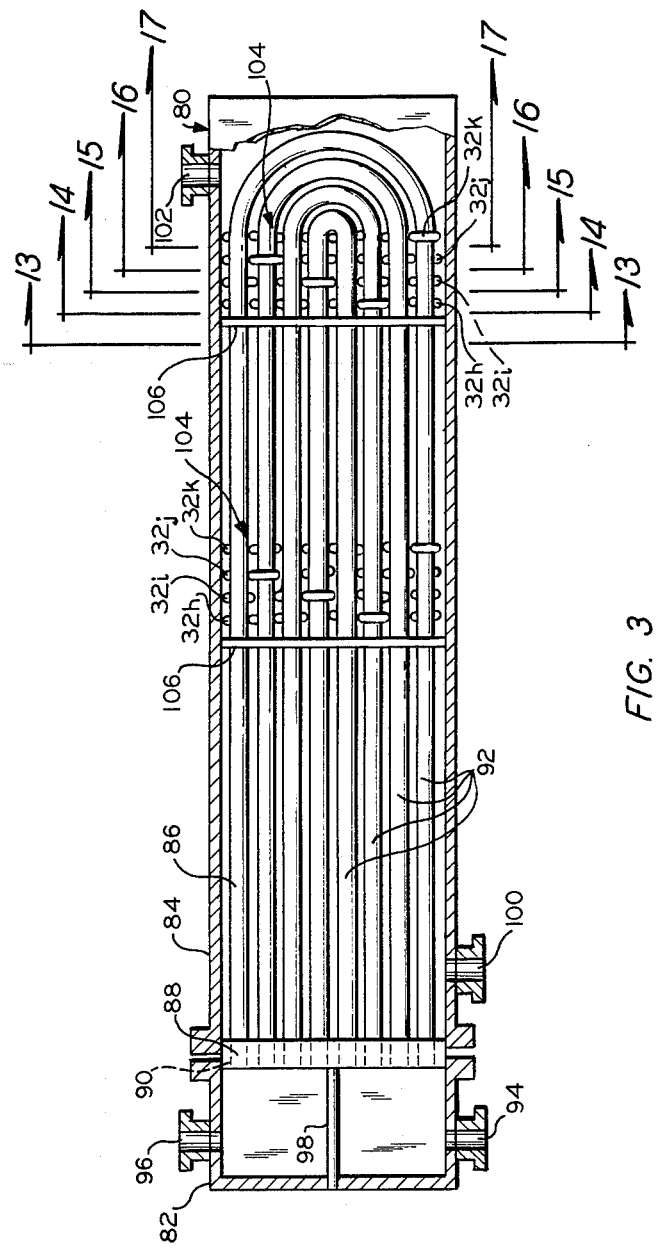
FIG. 3 is a side elevation view of another form of double pass heat exchanger utilizing a single tube sheet and floating U-shaped tubes constructed in accordance with the present invention with portions of the shell broken away to more clearly illustrate the tube bundle construction.

Referring now to FIG. 3, another form of double pass heat exchanger is illustrated therein and is generally designated by the reference character 80. The heat exchanger 80 comprises a baffled inlet-outlet head 82, a shell 84 and a tube bundle 86 positioned within the shell 84.

The tube bundle 86 includes a single tube sheet 88 having apertures 90 formed therein through which the ends of a plurality of U-shaped tubes 92 extend. The ends of the tubes are secured in the apertures of the tube sheet by suitable means such as by welding or expanding the tubes into the tube sheet to provide leakproof spacing of (support for) the end portions of the plurality of parallel aligned tubes 92. Nozzles 94 and 96 communicate with the lower and upper sides of the head 92, respectively, and are separated one from the other within the channel by means of a partition 98, thus providing means for passing a first fluid through one open end of each of the tubes 92 of the tube bundle 86 in a first direction and returning the first fluid through the open opposite ends of the tubes in the tube bundle 86 in a second direction and resulting in two fluid passes through the U-shaped tubes of the tube bundle 86 intermediate the tube sheet 88 and the U-shaped bends of the tubes 92. Nozzles 100 and 102 communicate with the respective ends of the shell side of the heat exchanger 80 and provide means for passing a second fluid over the outside surfaces of the U-shaped tubes 92. Nozzles 94 and 100 are preferably fluid inlet nozzles while nozzles 96 and 102 are preferably fluid outlet nozzles.

As shown in FIGS. 13, 14, 15, 16 and 17, the U-shaped tubes 92 are arranged in a plurality of rows each lying in a horizontal plane and in a plurality of columns each lying in a plane intersecting the planes of the tube rows at an angle of 90 degrees. The tubes in each tube row are equally spaced from the tubes next adjacent thereto as are the tubes in each tube column.

Intermediate the tube sheet 88 and U-shaped bends of the tubes 92 of the tube bundle 86, means are provided at predetermined intervals for supporting the tubes in spaced mutually parallel relation and suppressing vibration. Each supporting means is generally designated by the reference character 104. In the heat exchanger 80, one supporting means 104 is installed on the one end portion of the tube bundle 86 adjacent the U-shaped bends of the tubes 92 while a second supporting means 104 is positioned intermediate the tube sheet 88 and the first-mentioned supporting means. It will be understood that any number of supporting means may be installed in the tube bundle 86 as desired. The supporting means 104 comprises a plurality of annular enlargements in the form of the previously described resilient annular spring clips 32 disposed around and frictionally secured to the outer surfaces of selected tubes 92. Positioning and securing of the spring clips 32 to the tubes 92 is identical to that described above for the heat exchanger 10 and need not be described in detail again. It will also be understood that the alternate form of resilient annular spring clip designated by the reference character 38 can also be employed in the construction of the heat exchanger 80.

The supporting means 104 further includes retaining means in the form of a ring structure or the like 106 which extends around the bundle of tubes 86 proximate to the spring clips 32. The ring structure 106 engages and maintains the tubes 92 in spaced mutually parallel relation with the resilient annular spring clips 32 contacting the respective next adjacent tubes 92 whereby relative tube position is maintained and tube vibration is suppressed in the area of each of the supporting means 104. The 8 tubes by 8 tubes square configuration of heat exchange bundle 86 of FIGS. 3, 13, 14, 15, 16 and 17 is shown to clearly portray the application of this novel support method and apparatus to a U-tube bundle. Such a tube bundle would of necessity be housed in a shell 84 of square cross-section, compatibly dimensioned, as with bundle 56 of FIG. 2, the addition of U-tubes to form a nearly circular bundle would permit its use in cylindrical shells, suitable for higher pressure service. A frequent use of U-tube bundles is as reboiling heaters for large fractionating columns wherein the instant tube spacing and support method would be very suitable.

Figure 14:
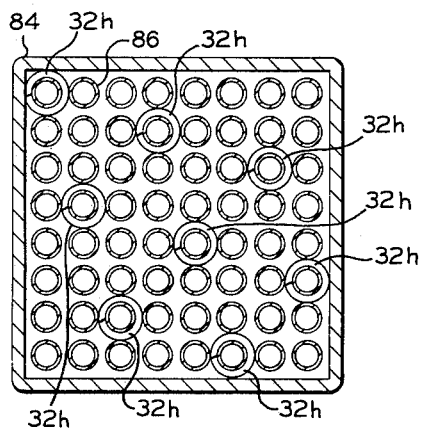
FIG. 14 is a cross-sectional view taken along line 14—14 of FIG. 3.
Figure 15:
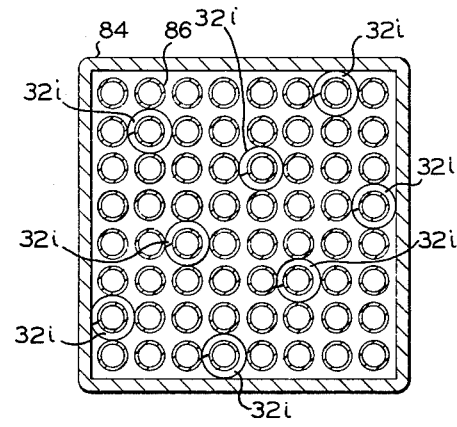
FIG. 15 is a cross-sectional view taken along line 15—15 of FIG. 3.
Figure 16:
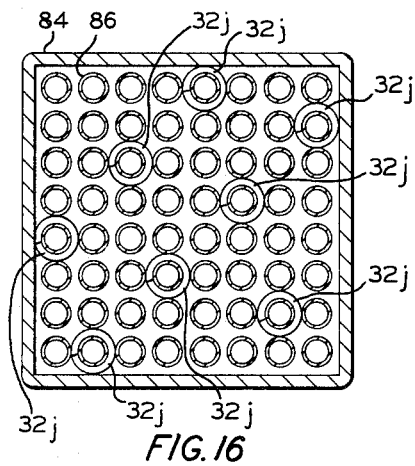
FIG. 16 is a cross-sectional view taken along line 16—16 of FIG. 3.
Figure 17:
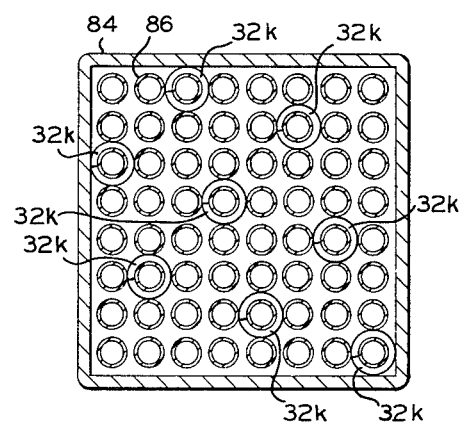
FIG. 17 is a cross-sectional view taken along line 17—17 of FIG. 3.

The resilient annular spring clips 32 are so longitudinally positioned on the tubes 92 that transversely adjacent spring clips are longitudinally spaced apart along the tube bundle to minimize pressure drop of the heat transfer medium passing thereby. In the tube bundle 86, the spring clips 32 are arranged in four transverse planes which are aligned normal to the longitudinal axes of the tubes 92 and which are spaced longitudinally along the tubes. FIG. 14 illustrates the spring clips in the transverse plane nearest the ring structure 106, the spring clips in this plane being designated as 32h. FIG. 15 illustrates the spring clips lying in the second transverse plane, each spring clip being designated by the reference character 32i, which second transverse plane is longitudinally spaced from the first transverse plane of the spring clips 32h. FIG. 16 illustrates the third transverse plane spaced longitudinally from the previously mentioned second transverse plane and in which each of the third group of spring clips lies, each of the third group of spring clips being designated by the reference character 32j. FIG. 17 illustrates the spring clips lying in the fourth transverse plane spaced longitudinally from the previously mentioned third transverse plane and in which each of the fourth group of spring clips lies, each of the fourth group of spring clips being designated by the reference character 32k.

It will be seen that the arrangement of spring clips 32 in the supporting means 104 places no more than 8 spring clips in any one plane of the 64-tube tube bundle 86. This arrangement provides for a relatively small pressure drop across the supporting means 104 while rigidly supporting the tubes in the desired mutually parallel relation and suppressing vibration.

Each of the unitary heat exchanger tube bundles 14, 56 and 86, described above, can be advantageously assembled in the following manner. The method of assembly involves arranging the tubes longitudinally in a plurality of tube rows in a plurality of tube columns with each tube row spaced a distance from an adjacent tube row and with each tube column spaced a distance from an adjacent tube column with the tubes of each row being positioned in a common plane and the tubes of each column being positioned in a common plane, the planes of the tube columns intersecting the planes of the tube rows at a predetermined angle. A first set of resilient annular spring clips are positioned around and in frictional engagement with a first set of selected individual tubes whereby the outer periphery of each of the first set of resilient annular spring clips contacts the outer surface of each next adjacent tube. At least one additional set of resilient annular spring clips is positioned around and in frictional engagement with a corresponding at least one additional set of selected invididual tubes, each additional set of spring clips being longitudinally spaced from the first set of spring clips whereby the outer periphery of each spring clip of each additional set contacts the outer surface of each next adjacent tube. After sufficient annular spring clips are installed on selected corresponding tubes, the tubes and the annular spring clips are urged together into firm contact with each other and the tubes are encircled with a rigid structure contacting the outermost tubes to maintain the tubes and annular spring clips in firm contact with each other to form a unitary tube bundle assembly.

Changes may be made in the cnstruction and arrangement of parts or elements of the various embodiments disclosed herein without departing from the spirit and scope of the invention as defined in the following claims.

That which is claimed is:

1. A method of assembly of a unitary heat exchanger tube bundle assembly comprising a plurality of tubes, said method comprising the steps of:
   arranging the tubes in a plurality of tube rows and a plurality of tube columns with each tube row spaced a distance from an adjacent tube row and each tube column spaced a distance from an adjacent tube column with the tubes of each row being positioned in a common plane and the tubes of each column being positioned in a common plane, the common plane of each column of tubes intersecting the planes of the rows of tubes at a predetermined angle;
   positioning a plurality of resilient annular spring clips around selected individual tubes, each said annular spring clip defining a spiral extending through no more than two turns about an axis and having two end faces whereby each of said spring clips contacts the outer surface of each next adjacent tube, said positioning step including:
      stressing each resilient spring clip against its internal spring bias to increase its inside diameter to a dimension greater than the outside diameter of a tube by engaging the end faces of said spring clip with one another;
      positioning each stressed spring clip over a selected individual tube at the desired location on the tube; and
      permitting each stressed spring clip to partially relax from its stressed condition to frictionally engage the outer surface of the corresponding individual tube in response to its internal spring bias at the desired location on the tube by disengaging the spring clip end faces from one another;
   urging the tubes and resilient annular spring clips into firm contact one with another; and
   encircling the tubes with a rigid structure contacting the outermost tubes to maintain the tubes and annular spring clips into firm contact one with another and to form a unitary tube bundle assembly.

2. A method of assembly of a unitary heat exchanger tube bundle assembly as defined in claim 1 wherein the common plane of each tube column intersects the planes of the tube rows at an angle of approximately 60°.

3. A method of assembly of a unitary heat exchanger tube bundle assembly as defined in claim 1 wherein the common plane of each tube column intersects the planes of the tube rows at an angle of approximately 90°.

4. A method of assembly of a unitary heat exchanger tube bundle assembly comprising a plurality of tubes, said method comprising the steps of:
   arranging the tubes longitudinally in a plurality of tube rows and a plurality of tube columns with each tube row spaced a distance from an adjacent tube row and each tube column spaced a distance from an adjacent tube column with the tubes of each tube row being positioned in a common plane and the tubes of each tube column being positioned in a common plane, the planes of the tube columns interesecting the planes of the tube rows at a predetermined angle;
   positioning a first set of resilient annular spring clips around and in frictional engagement with a first set of selected individual tubes, each of said first set of annular spring clips defining a spiral extending through no more than two turns about an axis and having two end faces, whereby the outer periphery of each of said first set of resilient annular spring clips contacts the outer surface of each next adjacent tube;
   positioning a second set of resilient annular spring clips around and in frictional engagement with a second set of selected individual tubes, longitudinally spaced from said first set of spring clips, each of said second set of annular spring clips defining a spiral extending through no more than two turns about an axis, whereby the outer periphery of each of said second set of resilient annular spring clips contacts the outer surface of each next adjacent tube;
   urging the tubes and the annular spring clips into firm contact with each other; and
   encircling the tubes with a rigid structure contacting the outermost tubes to maintain the tubes and annular spring clips in firm contact with each other and to form a unitary tube bundle assembly; and
   wherein said first and second sets of resilient annular spring clips are positioned by:
      deforming each resilient spring clip against its internal spring bias to increase its inside diameter to a dimension greater than the outside diameter of a selected corresponding respective individual tube by engaging the end faces of said spring clip with one another;

positioning each spring clip while so deformed over a selected corresponding respective individual tube at a predetermined location longitudinally displaced along the tube; and permitting each deformed spring clip to partially relax from its deformed condition to frictionally engage the outer surface of the corresponding respective individual tube in response to its internal spring bias at the predetermined location on the tube by disengaging the spring clip end faces from one another.

5. A method of assembly of a unitary heat exchanger tube bundle assembly as defined in claim 4 wherein:

the predetermined location of the first set of resilient annular spring clips lies in a first plane substantially normal to the longitudinal axes of the tubes; and the predetermined location of the second set of resilient annular spring clips lies in a second plane substantially normal to the longitudinal axes of the tubes and longitudinally spaced along the tubes from the first plane.

* * * * *